United States Patent [19]
Sumrall

[11] Patent Number: 6,082,752
[45] Date of Patent: Jul. 4, 2000

[54] STEP ASSEMBLY

[76] Inventor: Randall M. Sumrall, 912 N. Archusa Ave., Quitman, Miss. 39355

[21] Appl. No.: 09/156,089

[22] Filed: Sep. 17, 1998

[51] Int. Cl.$^7$ .................................................. B60R 3/00
[52] U.S. Cl. .......................................... 280/163; 182/150
[58] Field of Search ................................. 280/165, 163, 280/166; 182/150, 92, 91

[56] References Cited

U.S. PATENT DOCUMENTS

| | | | |
|---|---|---|---|
| 1,558,425 | 10/1925 | Yetter | 182/150 |
| 1,669,329 | 5/1928 | Elder | 182/150 |
| 2,348,661 | 5/1944 | Stevens | 182/150 |
| 2,575,503 | 11/1951 | Warren | 182/150 |
| 2,973,052 | 2/1961 | Miller | 182/150 |
| 3,590,950 | 7/1971 | Wilson | 182/150 |
| 4,108,277 | 8/1978 | Goldstein et al. | 182/82 |
| 4,312,536 | 1/1982 | Lloyd | 297/217 |
| 4,800,987 | 1/1989 | Liles | 182/92 |
| 4,947,961 | 8/1990 | Dudley | 182/92 |

*Primary Examiner*—Brian L. Johnson
*Assistant Examiner*—G B Klebe

[57] ABSTRACT

A step assembly for mounting to a wheel well of a vehicle to permit a user to step up on the side of the vehicle. The assembly includes a U-shaped rod adapted for mounting to a fender wall of a vehicle. One end of the U-shaped rod has an outwardly extending mounting extent which outwardly extends in a direction away from the front edge of the fender wall. An elongate step bracket is provided having upper and lower ends. The upper end of the step bracket has a pivot assembly coupling the upper end of the step bracket to the mounting extent of the U-shaped rod to permit pivoting of the step bracket at the upper end of the step bracket and to permit rotation of the step bracket about the longitudinal axis of the step bracket. A stirrup is coupled to the lower end of the step bracket.

7 Claims, 3 Drawing Sheets

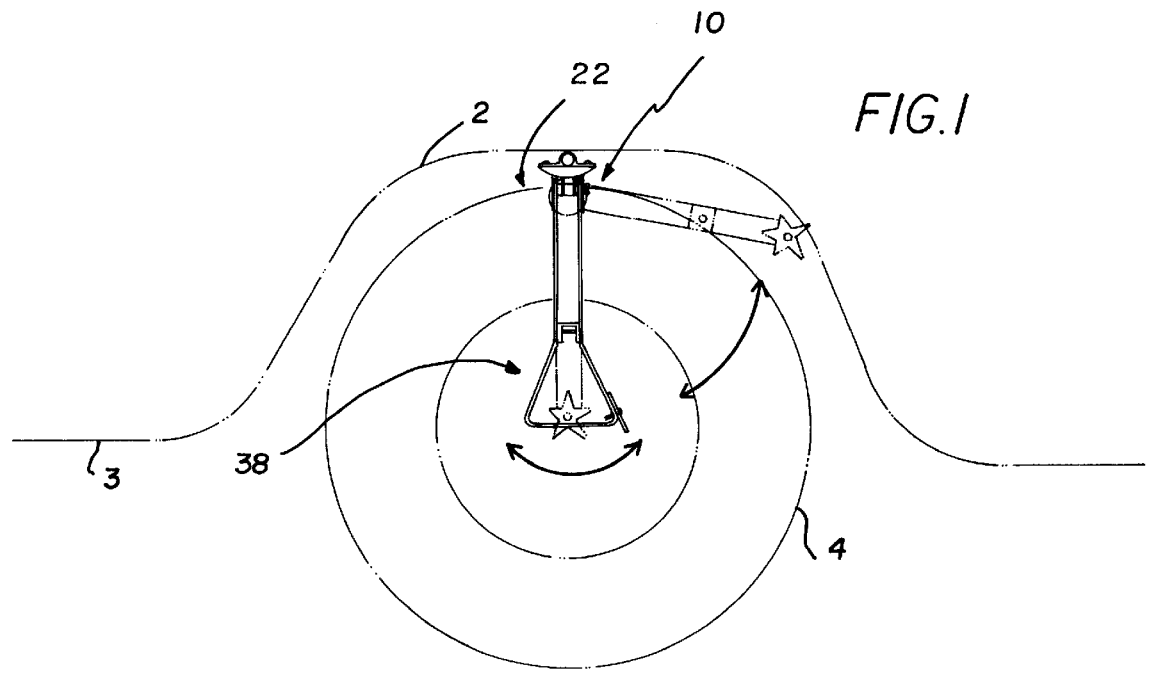
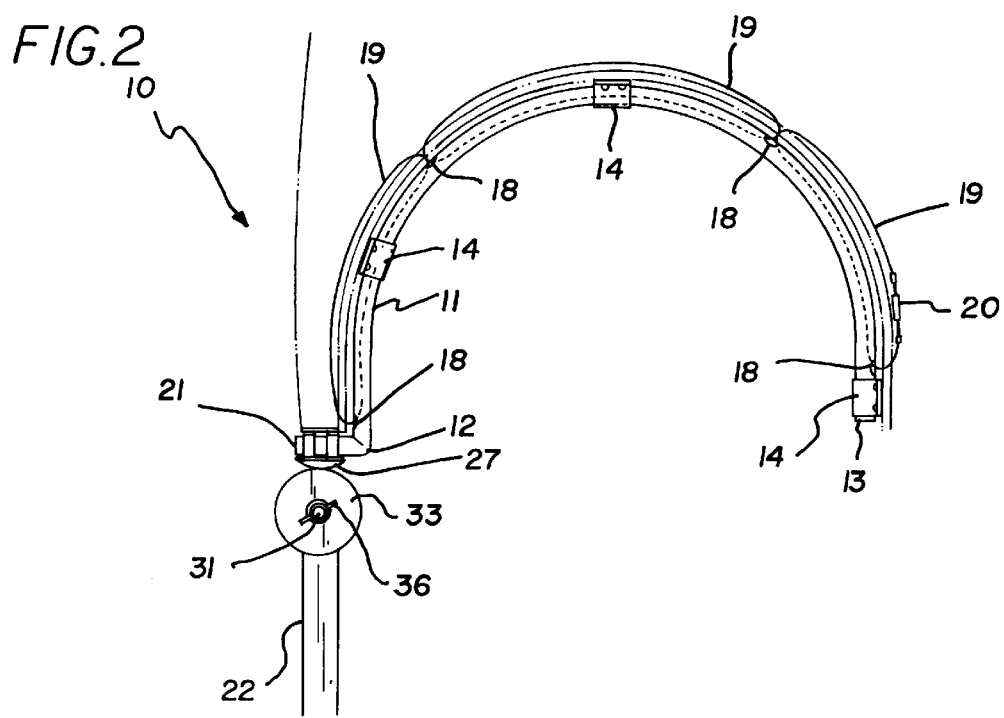

STEP ASSEMBLY

BACKGROUND OF THE INVENTION

1. Field of the Invention

The present invention relates to step devices for vehicles and more particularly pertains to a new step assembly for mounting to a wheel well of a vehicle to permit a user to step up on the side of the vehicle.

2. Description of the Prior Art

The use of step devices for vehicles is known in the prior art. More specifically, step devices for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,111,909; U.S. Pat. No. 4,194,754; U.S. Pat. No. 3,394,947; U.S. Pat. No. 4,116,457; U.S. Pat. No. 3,961,809; and U.S. Pat. No. 2,118,557.

While these devices fulfill their respective, particular objectives and requirements, the aforementioned patents do not disclose a new step assembly. The inventive device includes a U-shaped rod adapted for mounting to a fender wall of a vehicle. One end of the U-shaped rod has an outwardly extending mounting extent which outwardly extends in a direction away from the front edge of the fender wall. An elongate step bracket is provided having upper and lower ends. The upper end of the step bracket has a pivot assembly coupling the upper end of the step bracket to the mounting extent of the U-shaped rod to permit pivoting of the step bracket at the upper end of the step bracket and to permit rotation of the step bracket about the longitudinal axis of the step bracket. A stirrup is coupled to the lower end of the step bracket.

In these respects, the step assembly according to the present invention substantially departs from the conventional concepts and designs of the prior art, and in so doing provides an apparatus primarily developed for the purpose of mounting to a wheel well of a vehicle to permit a user to step up on the side of the vehicle.

SUMMARY OF THE INVENTION

In view of the foregoing disadvantages inherent in the known types of step devices for vehicles now present in the prior art, the present invention provides a new step assembly construction wherein the same can be utilized for mounting to a wheel well of a vehicle to permit a user to step up on the side of the vehicle.

The general purpose of the present invention, which will be described subsequently in greater detail, is to provide a new step assembly apparatus and method which has many of the advantages of the step devices for vehicles mentioned heretofore and many novel features that result in a new step assembly which is not anticipated, rendered obvious, suggested, or even implied by any of the prior art step devices for vehicles, either alone or in any combination thereof.

To attain this, the present invention generally comprises a U-shaped rod adapted for mounting to a fender wall of a vehicle. One end of the U-shaped rod has an outwardly extending mounting extent which outwardly extends in a direction away from the front edge of the fender wall. An elongate step bracket is provided having upper and lower ends. The upper end of the step bracket has a pivot assembly coupling the upper end of the step bracket to the mounting extent of the U-shaped rod to permit pivoting of the step bracket at the upper end of the step bracket and to permit rotation of the step bracket about the longitudinal axis of the step bracket. A stirrup is coupled to the lower end of the step bracket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new step assembly apparatus and method which has many of the advantages of the step devices for vehicles mentioned heretofore and many novel features that result in a new step assembly which is not anticipated, rendered obvious, suggested, or even implied by any of the prior art step devices for vehicles, either alone or in any combination thereof.

It is another object of the present invention to provide a new step assembly which may be easily and efficiently manufactured and marketed.

It is a further object of the present invention to provide a new step assembly which is of a durable and reliable construction.

An even further object of the present invention is to provide a new step assembly which is susceptible of a low cost of manufacture with regard to both materials and labor, and which accordingly is then susceptible of low prices of sale to the consuming public, thereby making such step assembly economically available to the buying public.

Still yet another object of the present invention is to provide a new step assembly which provides in the apparatuses and methods of the prior art some of the advantages thereof, while simultaneously overcoming some of the disadvantages normally associated therewith.

Still another object of the present invention is to provide a new step assembly for mounting to a wheel well of a vehicle to permit a user to step up on the side of the vehicle.

Yet another object of the present invention is to provide a new step assembly which includes a U-shaped rod adapted for mounting to a fender wall of a vehicle. One end of the U-shaped rod has an outwardly extending mounting extent which outwardly extends in a direction away from the front edge of the fender wall. An elongate step bracket is provided having upper and lower ends. The upper end of the step bracket has a pivot assembly coupling the upper end of the step bracket to the mounting extent of the U-shaped rod to permit pivoting of the step bracket at the upper end of the step bracket and to permit rotation of the step bracket about the longitudinal axis of the step bracket. A stirrup is coupled to the lower end of the step bracket.

Still yet another object of the present invention is to provide a new step assembly that may be mounted to a rear wheel well of a truck so that a user can step up on the side of the truck to access the load bed of the truck. The assembly may also be mounted on recreational vehicles and vans so that a user can reach towards the top regions of the recreational vehicle or van.

Even still another object of the present invention is to provide a new step assembly that may be pivoted out of the way from the tire and wheel of the vehicle so that it does not become an obstruction when not in use or when the tire needs to be changed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new step assembly on a vehicle according to the present invention.

FIG. 2 is another schematic side view of the present invention taken cross sectionally in the wheel well.

DESCRIPTION OF THE PREFERRED EMBODIMENT

Figure 3:
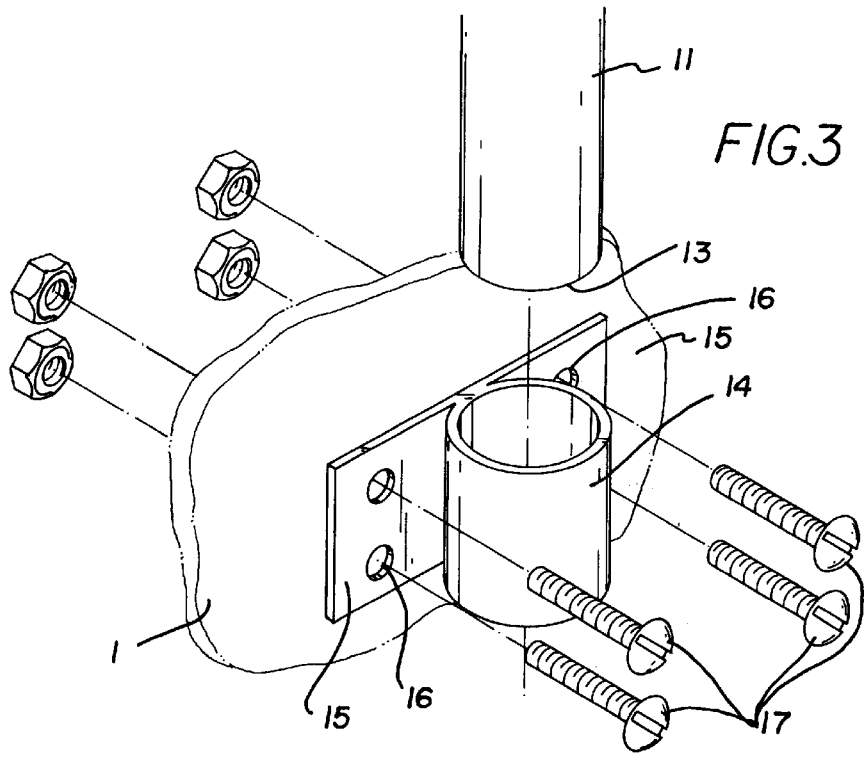
FIG. 3 is a schematic partial perspective view of the present invention.

With reference now to the drawings, and in particular to FIGS. 1 through 6 thereof, a new step assembly embodying the principles and concepts of the present invention and generally designated by the reference numeral 10 will be described.

In use, the step assembly 10 is designed for mounting to an fender wall 1 of a vehicle. The fender wall 1 defines a wheel well for a wheel 4 of the vehicle. The fender wall 1 has exterior and interior surfaces, and a front edge region 2 adjacent a side of the vehicle 3. As best illustrated in FIGS. 1 through 6, the step assembly 10 generally comprises a U-shaped rod 11 adapted for mounting to a fender wall 1 of a vehicle. One end 12 of the U-shaped rod 11 has an outwardly extending mounting extent 21 which outwardly extends in a direction away from the front edge 2 of the fender wall 1. An elongate step bracket 22 is provided having upper and lower ends 23,24. The upper end 23 of the step bracket 22 has a pivot assembly coupling the upper end 23 of the step bracket 22 to the mounting extent 21 of the U-shaped rod 11 to permit pivoting of the step bracket 22 at the upper end 23 of the step bracket 22 and to permit rotation of the step bracket 22 about the longitudinal axis of the step bracket 22. A stirrup 38 is coupled to the lower end 24 of the step bracket 22.

In closer detail, the U-shaped rod 11 has a pair of opposite ends 12,13 and preferably has a generally circular transverse cross section. The U-shaped rod 11 is adapted for inverting and mounting to a fender wall 1 of a vehicle such that one end 12 of the U-shaped rod 11 is positioned adjacent a front edge region 2 of the fender wall 1 and a wheel 4 in a wheel well defined by the fender wall 1 is located in a region between the ends 12,13 of the U-shaped rod 11. Preferably, the U-shaped rod 11 has a plurality of mounting brackets 14 disposed thereon designed for attachment to the fender wall 1. As illustrated in FIG. 3, each of the mounting brackets 14 has a pair of side flanges 15. Each of the side flanges 15 has a pair of holes 16 for extending threaded fasteners 17 therethrough and through the fender wall 1 to couple the mounting brackets 14 to the fender wall 1.

With reference to FIG. 2, the U-shaped rod 11 also preferably has a plurality of spaced apart bores 18 therethrough. The bores 18 of the U-shaped rod 11 are arranged in a row extending between the ends of the U-shaped rod 11. A plurality of cable loops 19 are provided with a cable loop 19 extended through each adjacent pair of bores 18 of the U-shaped rod 11 and through corresponding holes in the fender wall 1 to help hold the U-shaped rod 11 to the fender wall 1. Each of the cable loops 19 preferably has a buckle 20 for permitting separation of attached ends of the respective cable loop 19 for aiding removal of the cable loop 19 from the U-shaped rod 11 and the fender wall 1.

The one end 12 of the U-shaped rod 11 has an outwardly extending mounting extent 21. The mounting extent 21 has a longitudinal axis preferably extending generally perpendicular to an adjacent portion of the U-shaped rod 11. The mounting extent 21 is designed for outwardly extending in a direction away from the front edge 2 of the fender wall 1.

The elongate step bracket 22 has upper and lower ends 23,24 and a longitudinal axis extending between the upper and lower ends 23,24. The longitudinal axis of the step bracket 22 preferably lies in a vertical plane when the step bracket 22 is mounted to the vehicle. The step bracket 22 further comprises a spaced apart pair of generally parallel plates 25,26 coupled together at the upper and lower ends 23,24 of the step bracket 22.

Figure 4:
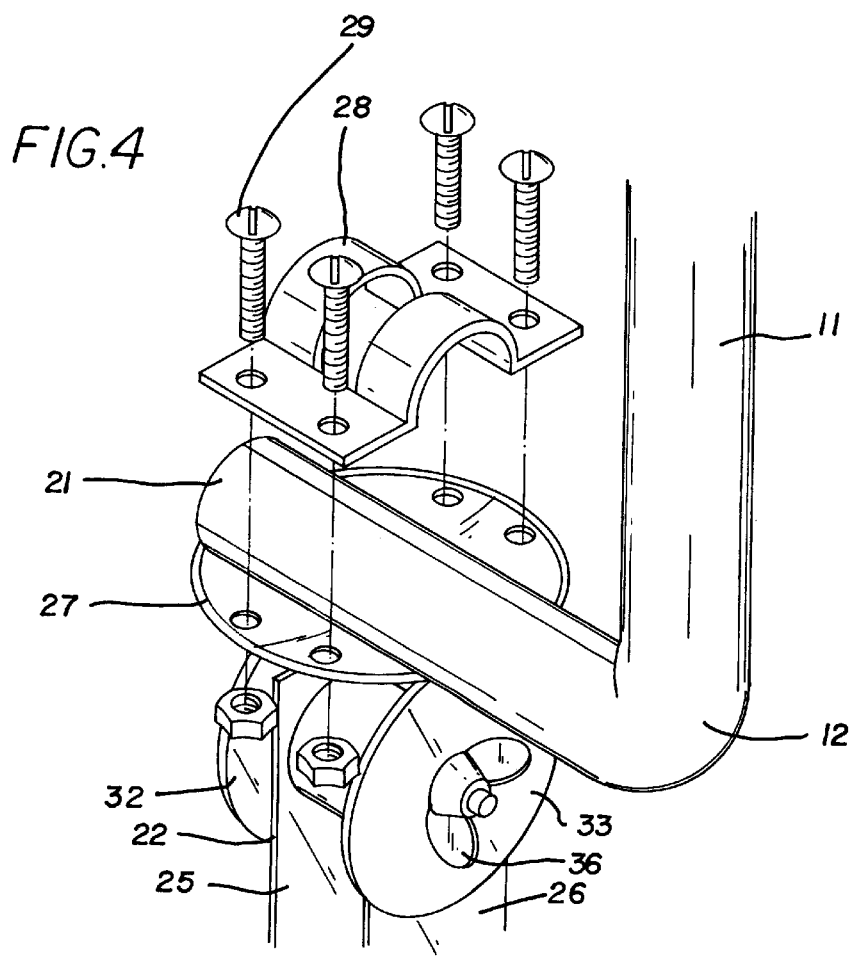
FIG. 4 is a schematic partial perspective view of the pivot assembly region of the present invention.
Figure 5:
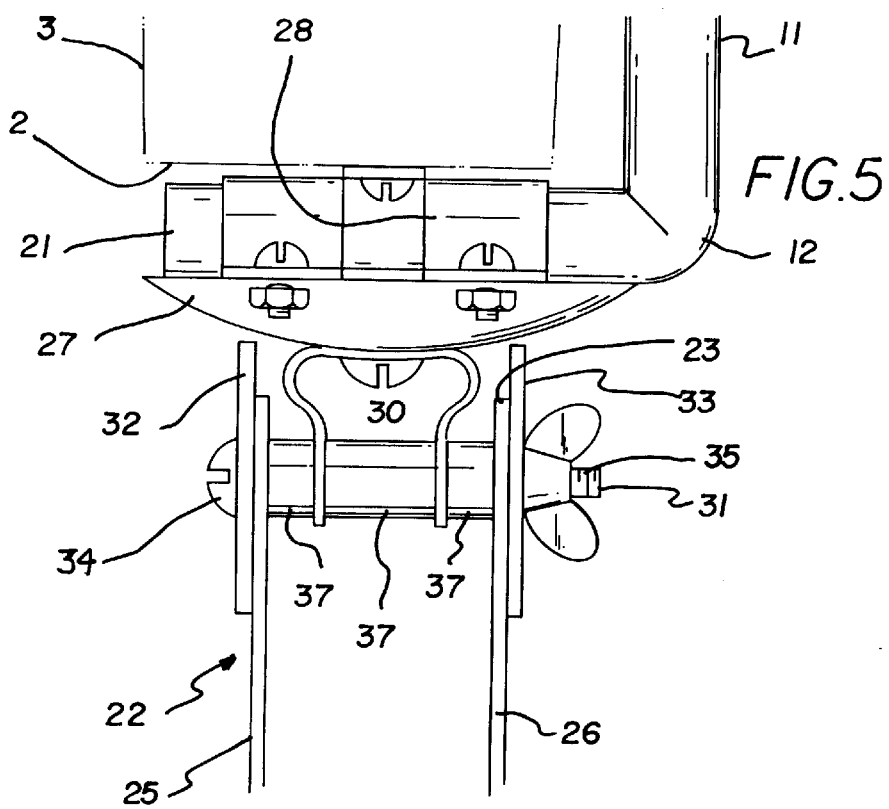
FIG. 5 is a schematic partial side view of the pivot assembly region of the present invention.
Figure 6:
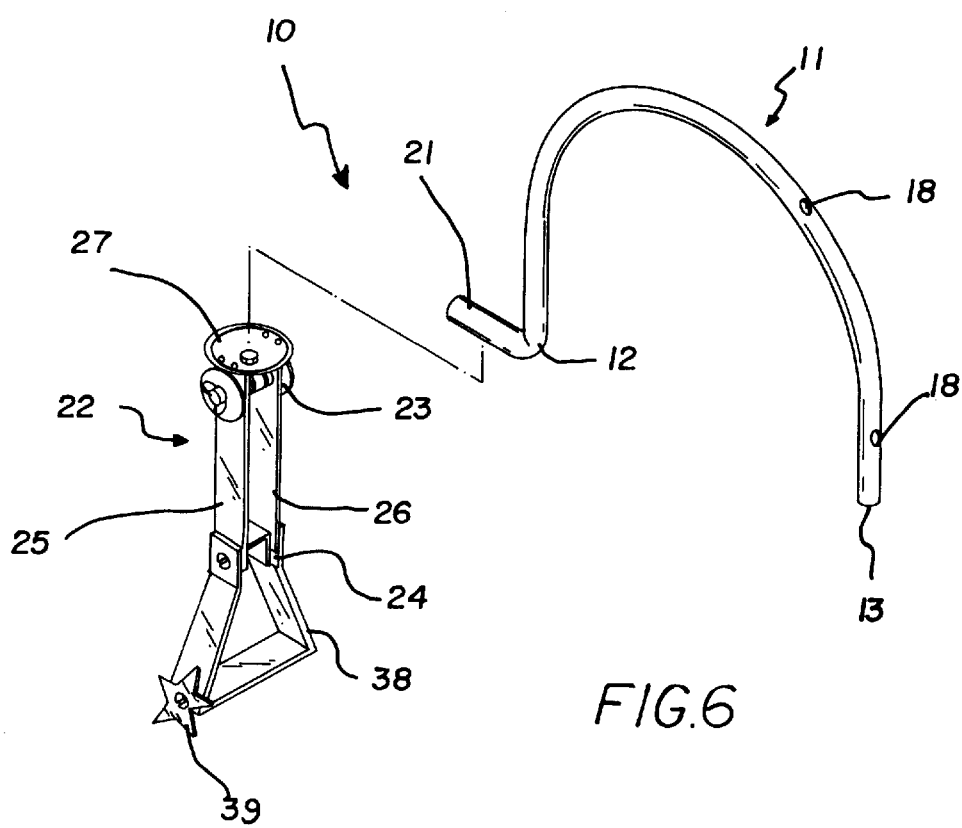
FIG. 6 is a schematic exploded perspective view of the present invention.

With reference to FIGS. 4 and 5, the upper end 23 of the step bracket 22 has a pivot assembly coupling the upper end 23 of the step bracket 22 to the mounting extent 21 of the U-shaped rod 11 to permit pivoting of the step bracket 22 at the upper end 23 of the step bracket 22 in the plane of the longitudinal axis of the step bracket 22 and to permit rotation of the step bracket 22 about the longitudinal axis of the step bracket 22. The pivot assembly has a cupped top bracket 27 which is rotationally coupled to the upper end 23 of the step bracket 22 to permit rotation of the top bracket 27 and the step bracket 22 about the longitudinal axis of the step bracket 22 with respect to one another. The top bracket 27 of the pivot assembly is coupled to the mounting extent 21 by a U-shaped bracket 28 and four threaded fasteners 29 such that the longitudinal axis of the step bracket 22 extends generally perpendicular to the longitudinal axis of the mounting extent 21.

The pivot assembly also has a pivot bracket 30 coupled to the top member. The pivot bracket 30 is extended between the plates 25,26 of the step bracket 22 at the upper end 23 of the step bracket 22. The pivot bracket 30 has a pair of generally coaxial holes therethrough. The pivot assembly has a pivot bolt 31 extending through the plates 25,26 of the step bracket 22 adjacent the upper end 23 of the step bracket 22. The pivot bolt 31 is pivotally mounted to the pivot bracket 30 by extension of the pivot bolt 31 through the generally coaxial holes of the pivot bracket 30 to permit pivoting of the step bracket 22 at the upper end 23 of the step bracket 22 in the plane of the longitudinal axis of the step bracket 22.

The pivot assembly also has a pair of disks 32,33 disposed on the pivot bolt 31. The plates 25,26 of the step bracket 22 are positioned between the disks 32,33. The pivot bolt 31 has opposite head and threaded portions 34,35. The threaded portion 35 of the pivot bolt 31 has a wing-nut 36 threaded thereon. The disks 32,33 are interposed between the head portion 34 and the nut 36 such that advancing the nut 36 on the threaded portion 35 pushes the disks 32,33 towards each other to clamp the upper end 23 of the step bracket 22 in a fixed position with respect to the pivot bracket 30. Ideally, as illustrated in FIG. 5, the pivot bolt 31 has a plurality of spacers 37 disposed thereon between the plates 25,26 to prevent the plates 25,26 from squeezing too close together.

The stirrup 38 is coupled to the lower end 24 of the step bracket 22. In use, the stirrup 38 designed for resting a foot of a user thereon. Preferably, the stirrup 38 is generally triangular in configuration and has an upper vertex located adjacent the lower end 24 of the step bracket 22. The stirrup 38 ideally has a decorative piece 39, such as a star, coupled to a side vertex of the stirrup 38.

In use, the step bracket 22 is pivotable between a raised position and a lowered position when the step assembly is mounted to the fender wall 1 of a vehicle. The longitudinal axis of the step bracket 22 extends generally vertically when the step bracket 22 is in the lowered position in front of the wheel so that a user may rest a foot on the stirrup 38 to climb up on the side of the vehicle 3. When the step bracket is in the raised position, the longitudinal axis of the step bracket 22 is generally horizontal and positioned above the tire so that the step assembly is out of the way when the wheel is removed from the vehicle to change a tire. With reference to FIG. 1, the step bracket 22 is also rotatable between a position where the stirrup 38 lies in a vertical plane extending generally perpendicular to the side of the vehicle 3 and a position where the stirrup 38 lies in a vertical plane extending generally parallel to the side of the vehicle 3. These rotations permit positioning of the stirrup 38 in any desired orientation by the user to suit the circumstances.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A step assembly for mounting to an fender wall of a vehicle, the fender wall defining a wheel well for a wheel of the vehicle, the fender wall having exterior and interior surfaces, and a front edge region adjacent a side of the vehicle, said step assembly comprising:

a U-shaped rod having a pair of opposite ends;

said U-shaped rod being adapted for mounting to a fender wall of a vehicle such that one end of the U-shaped rod is positioned adjacent a front edge region of the fender wall and a wheel in a wheel well defined by said fender wall is located in a region between said ends of said U-shaped rod;

said one end of said U-shaped rod having an outwardly extending mounting extent, said mounting extent being adapted for outwardly extending in a direction away from the front edge of the fender wall;

an elongate step bracket having upper and lower ends and a longitudinal axis extending between said upper and lower ends;

said upper end of said step bracket having a pivot assembly coupling said upper end of said step bracket to said mounting extent of said U-shaped rod to permit pivoting of said step bracket at said upper end of said step bracket in said plane of said longitudinal axis of said step bracket and to permit rotation of said step bracket about said longitudinal axis of said step bracket; and a stirrup being coupled to said lower end of said step bracket, said stirrup adapted for resting a foot of a user thereon.

2. The step assembly of claim 1, wherein said U-shaped rod has a plurality of mounting brackets disposed thereon adapted for attachment to the fender wall, each of said mounting brackets having a pair of side flanges, each of said side flanges having a pair of holes for extending threaded fasteners therethrough and through the fender wall to couple the mounting brackets to the fender wall.

3. The step assembly of claim 1, further comprising a plurality of cable loops, wherein said U-shaped rod has a plurality of spaced apart bores therethrough, said bores of said U-shaped rod being arranged in a row extending between said ends of said U-shaped rod, and wherein a cable loop is extended through each adjacent pair of bores of said U-shaped rod and being adapted through corresponding holes in the fender wall to help hold said U-shaped rod to said fender wall.

4. The step assembly of claim 1, wherein said pivot assembly has a top bracket being rotationally coupled to said upper end of said step bracket to permit rotation with respect to one another of said top bracket and said step bracket about said longitudinal axis of said step bracket, said top bracket of said pivot assembly being coupled to said mounting extent.

5. The step assembly of claim 4, wherein said step bracket further comprises a spaced apart pair of generally parallel plates, wherein said pivot assembly has a pivot bracket coupled to said top member, said pivot bracket being extended between said pair plates of said step bracket at said upper end of said step bracket, said pivot assembly having a pivot bolt extending through said plates of said step bracket adjacent said upper end of said step bracket, said pivot bolt being pivotally mounted to said pivot bracket to permit pivoting of said step bracket at said upper end of said step bracket in said plane of said longitudinal axis of said step bracket.

6. The step assembly of claim 5, wherein said pivot assembly has a pair of disks disposed on said pivot bolt, said plates of said step bracket being positioned between said disks, wherein said pivot bolt has opposite head and threaded portions, said threaded portion of said pivot bolt having a nut threaded thereon, said disks being interposed between said head portion and said nut such that advancing said nut on said threaded portion pushes said disks towards each other to clamp said upper end of said step bracket in a fixed position with respect to said pivot bracket.

7. A step assembly for mounting to an fender wall of a vehicle, the fender wall defining a wheel well for a wheel of the vehicle, the fender wall having exterior and interior surfaces, and a front edge region adjacent a side of the vehicle, said step assembly comprising:

a U-shaped rod having a pair of opposite ends, said U-shaped rod having a generally circular transverse cross section;

said U-shaped rod being adapted for mounting to a fender wall of a vehicle such that one end of the U-shaped rod is positioned adjacent a front edge region of the fender wall and a wheel in a wheel well defined by said fender wall is located in a region between said ends of said U-shaped rod;

wherein said U-shaped rod has a plurality of mounting brackets disposed thereon adapted for attachment to the fender wall, each of said mounting brackets having a pair of side flanges, each of said side flanges having a pair of holes for extending threaded fasteners therethrough and through the fender wall to couple the mounting brackets to the fender wall;

said U-shaped rod having a plurality of spaced apart bores therethrough, said bores of said U-shaped rod being arranged in a row extending between said ends of said U-shaped rod;

a plurality of cable loops, a cable loop being extended through each adjacent pair of bores of said U-shaped rod and being adapted through corresponding holes in the fender wall to help hold said U-shaped rod to said fender wall;

each of said cable loops having a buckle for permitting separation of attached ends of the respective cable loop for aiding removal of said cable loop from the U-shaped rod and the fender wall;

said one end of said U-shaped rod having an outwardly extending mounting extent, said mounting extent having a longitudinal axis extending generally perpendicular to an adjacent portion of said U-shaped rod, said mounting extent being adapted for outwardly extending in a direction away from the front edge of the fender wall;

an elongate step bracket having upper and lower ends and a longitudinal axis extending between said upper and lower ends, said longitudinal axis of said step bracket lying in a plane, said plane of said longitudinal axis being adapted for extending generally vertically when said step bracket is mounted to the vehicle, said step bracket further comprising a spaced apart pair of generally parallel plates coupled together at said upper and lower ends of said step bracket;

said upper end of said step bracket having a pivot assembly coupling said upper end of said step bracket to said mounting extent of said U-shaped rod to permit pivoting of said step bracket at said upper end of said step bracket in said plane of said longitudinal axis of said step bracket and to permit rotation of said step bracket about said longitudinal axis of said step bracket;

said pivot assembly having a top bracket being rotationally coupled to said upper end of said step bracket to permit rotation with respect to one another of said top bracket and said step bracket about said longitudinal axis of said step bracket;

said top bracket of said pivot assembly being coupled to said mounting extent such that said longitudinal axis of said step bracket extends generally perpendicular to said longitudinal axis of said mounting extent;

said pivot assembly having a pivot bracket coupled to said top member, said pivot bracket being extended between said plates of said step bracket at said upper end of said step bracket;

said pivot assembly having a pivot bolt extending through said plates of said step bracket adjacent said upper end of said step bracket, said pivot bolt being pivotally mounted to said pivot bracket to permit pivoting of said step bracket at said upper end of said step bracket in said plane of said longitudinal axis of said step bracket;

said pivot assembly having a pair of disks disposed on said pivot bolt, said plates of said step bracket being positioned between said disks;

said pivot bolt having opposite head and threaded portions, said threaded portion of said pivot bolt having a nut threaded thereon, said disks being interposed between said head portion and said nut such that advancing said nut on said threaded portion pushes said disks towards each other to clamp said upper end of said step bracket in a fixed position with respect to said pivot bracket; and a stirrup being coupled to said lower end of said step bracket, said stirrup adapted for resting a foot of a user thereon, said stirrup being generally triangular in configuration and having an upper vertex located adjacent said lower end of said step bracket.

\* \* \* \* \*